(12) United States Patent
Koizumi

(10) Patent No.: US 8,996,763 B2
(45) Date of Patent: Mar. 31, 2015

(54) ELECTRONIC DEVICE, CONTROL METHOD, PROGRAM, AND RECORDING MEDIUM FOR REMOTELY OPERATING ELECTRONIC DEVICE

(71) Applicant: Canon Kabushiki Kaisha, Tokyo (JP)

(72) Inventor: Hidetaka Koizumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 13/714,924

(22) Filed: Dec. 14, 2012

(65) Prior Publication Data

US 2013/0155333 A1    Jun. 20, 2013

(30) Foreign Application Priority Data

Dec. 20, 2011 (WO) .................. PCT/JP2011/079527

(51) Int. Cl.
| | | |
|---|---|---|
| G06F 3/00 | (2006.01) | |
| G06F 5/00 | (2006.01) | |
| H04N 5/44 | (2011.01) | |
| G09G 5/00 | (2006.01) | |
| H04N 5/775 | (2006.01) | |
| H04N 21/4363 | (2011.01) | |

(52) U.S. Cl.
CPC ............... *H04N 5/4403* (2013.01); *G09G 5/00* (2013.01); *H04N 5/775* (2013.01); *H04N 21/43635* (2013.01)

USPC .................................... 710/58; 710/5; 710/16

(58) Field of Classification Search
None
See application file for complete search history.

(56) References Cited

U.S. PATENT DOCUMENTS 8,077,243 B2 *  12/2011  Morita et al. ............ 348/333.04

FOREIGN PATENT DOCUMENTS

| JP | 2009-159418 | 7/2009 |
|---|---|---|
| JP | 2011-130193 | 6/2011 |
| JP | 2011-229193 | 11/2011 |

* cited by examiner

*Primary Examiner* — Idriss N Alrobaye
*Assistant Examiner* — Richard B Franklin
(74) *Attorney, Agent, or Firm* — Canon USA, Inc., IP Division

(57) ABSTRACT

An electronic device executes a certain process when first data for instructing the electronic device to begin the certain process has been received from an external apparatus, and stops the certain process when the external apparatus has not been detected as a certain apparatus and when a first time has elapsed since the certain process was executed, even if second data for instructing the electronic device to stop the certain process has not been received.

15 Claims, 4 Drawing Sheets

ELECTRONIC DEVICE, CONTROL METHOD, PROGRAM, AND RECORDING MEDIUM FOR REMOTELY OPERATING ELECTRONIC DEVICE

TECHNICAL FIELD

The present invention relates to an electronic device that communicates with an external apparatus, a control method, a program, and a recording medium.

BACKGROUND ART

Now, a communication interface called HDMI (High-Definition Multimedia Interface) (registered trademark) is being proposed. A communication system (hereinafter referred to as the "HDMI system") conforming to HDMI standards includes a source apparatus and a sink apparatus. The source apparatus transmits playback video data through an HDMI interface, and the sink apparatus receives the video data transmitted from the source apparatus through the HDMI interface and displays the received video data.

In addition, in the HDMI system, the sink apparatus can control the source apparatus using commands (hereinafter referred to as the "CEC commands") conforming to CEC (Consumer Electronics Control) standards.

Currently, a technique is known in which a user remotely controls the source apparatus using a remote control for controlling the sink apparatus (PTL 1).

CITATION LIST

Patent Literature

PTL 1 Japanese Patent Laid-Open No. 2011-130193

When the user causes the source apparatus to execute a particular process by operating the remote control for controlling the sink apparatus, a signal is input to the sink apparatus from the remote control and the sink apparatus generates a CEC command in accordance with the signal input from the remote control. Furthermore, the sink apparatus transmits the generated CEC command to the source apparatus in order to make it possible to control the source apparatus using the remote control. In this case, the source apparatus executes the particular process specified by the remote control in accordance with the CEC command transmitted from the sink apparatus.

However, even when the user is no longer operating the source apparatus using the remote control for controlling the sink apparatus, the sink apparatus might not notify the source apparatus that the user is no longer operating the source apparatus.

In such a case, the source apparatus cannot correctly judge the timing at which control is to be executed such that the process specified by the remote control stops. Therefore, the source apparatus continues to execute the process specified by the remote control for the source apparatus at a time when the user operated the remote control. As a result, a situation in which the source apparatus continues to execute a process that is not intended by the user arises.

Therefore, an object of the present invention is to make it possible that when the user remotely operates an electronic device, the electronic device does not execute a process that is not intended by the user.

SUMMARY OF INVENTION

An electronic device according to the present invention is an electronic device including reception means that receives data from an external apparatus, and control means that executes a certain process when first data for instructing the control means to begin the certain process has been received from the external apparatus. When it has not been detected that the external apparatus is a certain apparatus and a first time has elapsed since the certain process was executed, the control means stops the certain process even if second data for instructing the control means to stop the certain process has not been received. The certain apparatus is an apparatus that transmits the second data to the electronic device.

A control method according to the present invention is a control method for controlling an electronic device, the control method including the steps of executing a certain process when first data for instructing the electronic device to begin the certain process has been received from an external apparatus, and stopping the certain process when it has not been detected that the external apparatus is a certain apparatus that transmits second data for instructing the electronic device to stop the certain process to the electronic device and when a first time has elapsed since the certain process was executed.

A program according to the present invention is a program for causing a computer to function as means for executing a certain process when first data for instructing the means to begin the certain process has been received from an external apparatus, and means for stopping the certain process when it has not been detected that the external apparatus is a certain apparatus that transmits second data for instructing the electronic device to stop the certain process to the electronic device and when a first time has elapsed since the certain process was executed.

A recording medium according to the present invention is a non-transitory computer-readable recording medium on which a program is recorded, the program causing a computer to function as means for executing a certain process when first data for instructing the means to begin the certain process has been received from an external apparatus, and means for stopping the certain process when it has not been detected that the external apparatus is a certain apparatus that transmits second data for instructing the electronic device to stop the certain process to the electronic device and when a first time has elapsed since the certain process was executed.

Further features of the present invention will become apparent from the following description of exemplary embodiments with reference to the attached drawings.

DESCRIPTION OF EMBODIMENTS

An embodiment of the present invention will be described in detail hereinafter on the basis of the accompanying drawings. It is to be noted that the present invention is not limited to a first embodiment that will be described hereinafter.

First Embodiment

Figure 1:
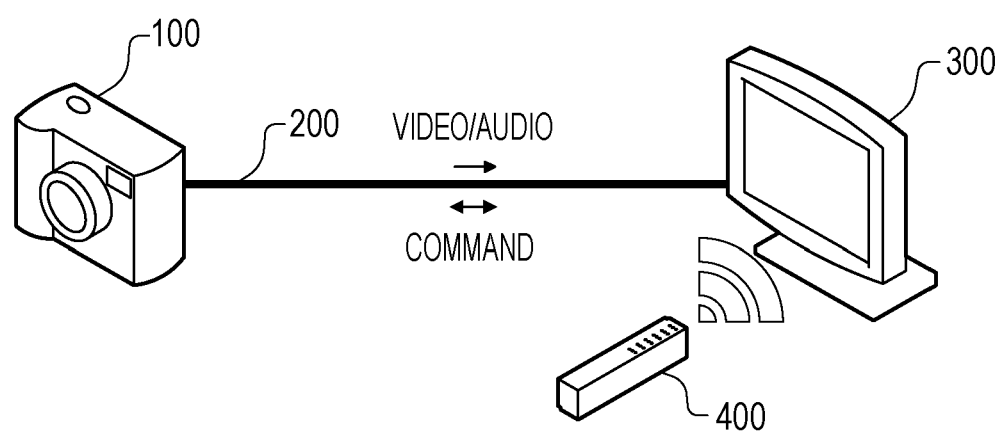
FIG. 1 is an example of a diagram illustrating a communication system according to a first embodiment of the present invention.
Figure 2:
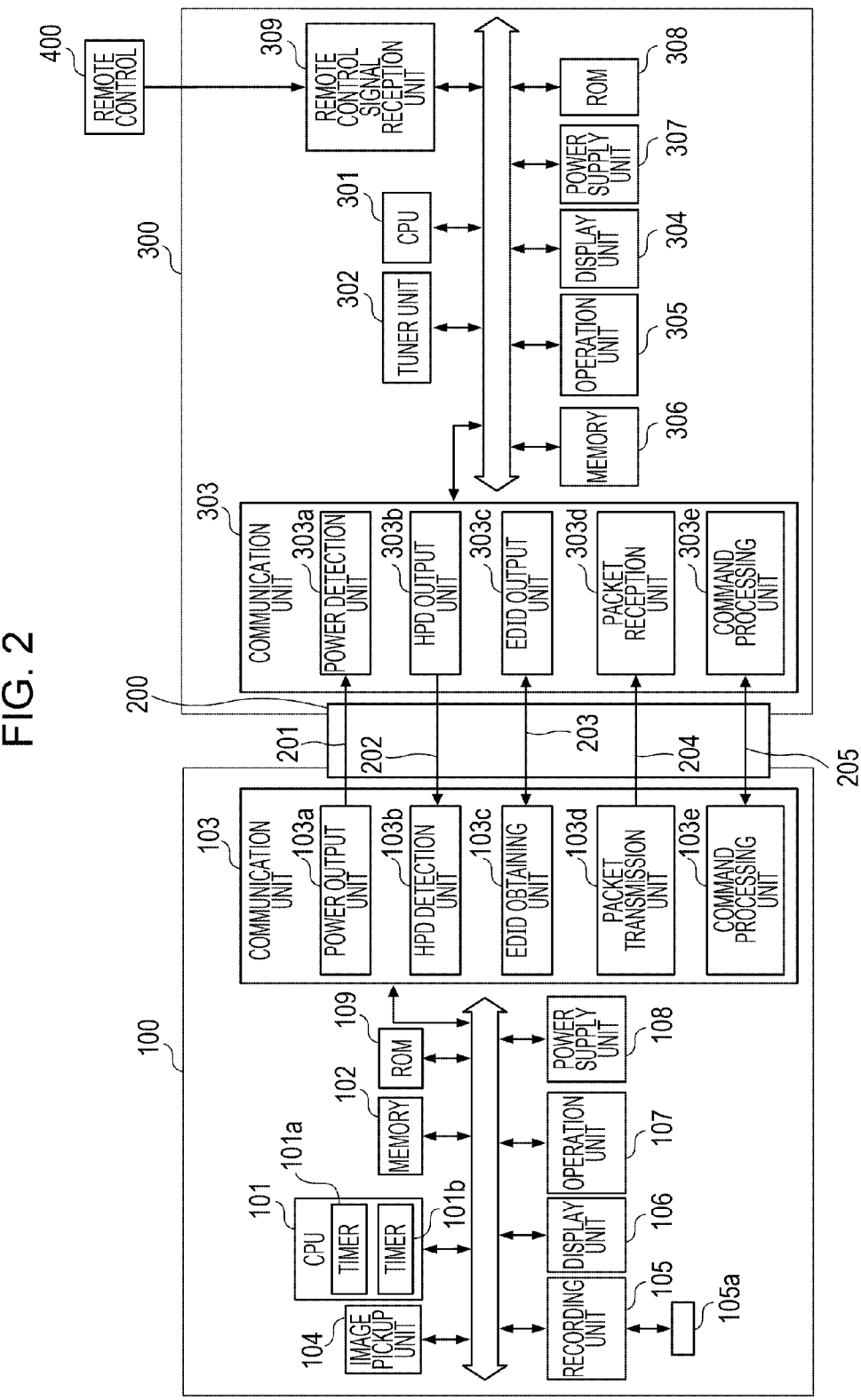
FIG. 2 is an example of a block diagram illustrating the communication system according to the first embodiment of the present invention.

As illustrated in FIG. 1 and FIG. 2, a communication system according to the first embodiment includes a communication apparatus 100, an external apparatus 300, a connection cable 200, and a remote control (remote controller) 400. The communication apparatus 100 and the external apparatus 300 are connected to each other through the connection cable 200.

The communication apparatus 100 is an electronic device that can transmit video data, audio data, and auxiliary data to the external apparatus 300 through the connection cable 200. The external apparatus 300 is a reception apparatus that displays the video data received from the communication apparatus 100 on a display and that outputs the audio data received from the communication apparatus 100 from a speaker. Both the communication apparatus 100 and the external apparatus 300 can transmit various control commands to each other through the connection cable 200.

In the first embodiment, the communication apparatus 100, the external apparatus 300, and the connection cable 200 conform to HDMI (High-Definition Multimedia Interface) standards. Therefore, the communication apparatus 100 is a source apparatus that functions as an HDMI source in the HDMI standards, and the external apparatus 300 is a sink apparatus that functions as an HDMI sink in the HDMI standards.

In the first embodiment, the communication apparatus 100 and the external apparatus 300 conform to a CEC (Consumer Electronics Control) protocol defined by the HDMI standards. The control commands bidirectionally transmitted between the communication apparatus 100 and the external apparatus 300 conform to the CEC protocol. The control commands conforming to the CEC protocol will be referred to as the "CEC commands" hereinafter.

The remote control 400 is a device that controls the external apparatus 300. The remote control 400 wirelessly communicates with the external apparatus 300. When the remote control 400 is operated by a user, the remote control 400 transmits a remote control signal corresponding to the operation by the user to the external apparatus 300. It is to be noted that the remote control 400 does not wirelessly communicate with the communication apparatus 100 directly. When the communication apparatus 100 is operated using the remote control 400, a remote control signal is transmitted from the remote control 400 to the external apparatus 300. In this case, the external apparatus 300 transmits a CEC command corresponding to the remote control signal input from the remote control 400 to the communication apparatus 100 through the connection cable 200. Thereafter, when the communication apparatus 100 has received the CEC command corresponding to the remote control signal from the external apparatus 300, the communication apparatus 100 controls the communication apparatus 100 in accordance with the received CEC command. As a result, the user can operate the communication apparatus 100 using the remote control 400.

In the first embodiment, a digital still camera is used as an example of the communication apparatus 100. It is to be noted that the communication apparatus 100 is not limited to the digital still camera, and a video output apparatus such as a digital single-lens reflex camera, a digital video camera, a recorder, or a DVD player may be used as the communication apparatus 100 insofar as the apparatus has the function of an HDMI source.

In the first embodiment, a television receiver (hereinafter referred to as the "television") is used as an example of the external apparatus 300. It is to be noted that the external apparatus 300 is not limited to the television, and a display apparatus such as a projector or a personal computer may be used as the external apparatus 300 insofar as the apparatus has the function of an HDMI sink. Alternatively, the external apparatus 300 may be an apparatus that functions as an HDMI repeater in the HDMI standards. It is to be noted that, in this case, the external apparatus 300 may be used as an AV amplifier.

In the following description, the communication apparatus 100 will be referred to as the "camera 100", the connection cable 200 will be referred to as the "HDMI cable 200", and the external apparatus 300 will be referred to as the "television 300".

HDMI Cable 200

Next, the HDMI cable 200 will be described with reference to FIG. 2.

The HDMI cable 200 includes a power transmission line 201, an HPD (Hot Plug Detect) line 202, and a DDC (Display Data Channel) line 203. The HDMI cable 200 further includes a TMDS (Transition Minimized Differential Signaling) line 204 and a CEC line 205.

The power transmission line 201 is a transmission line for supplying predetermined power from the camera 100 to the television 300.

The HPD line 202 is a transmission line for transmitting an HPD signal at a high voltage level (hereinafter referred to as the H level) or a low voltage level (hereinafter referred to as the L level) from the television 300 to the camera 100.

The DDC line 203 is a transmission line for transmitting device information regarding the television 300 from the television 300 to the camera 100. The device information regarding the television 300 is EDID (Extended Display Identification Data) or E-EDID (Enhanced EDID) regarding the television 300. Both the EDID and the E-EDID include identification information regarding the television 300 relating to the television 300, information relating to the display performance of the television 300 and the like, and information relating to the audio output performance of the television 300 as the device information regarding the television 300. For example, the EDID and the E-EDID include information relating to resolution, scanning frequencies, aspect ratios, color spaces, and the like supported by the television 300 and a physical address, which is information indicating a connection terminal of the television 300. The E-EDID is enhanced EDID, and includes a larger number of pieces of performance information than the EDID. For example, the E-EDID includes information relating to correspondence relating to formats of video data and audio data and 3D display formats supported by the television 300. Both the EDID and the E-EDID will be referred to as the "EDID" hereinafter.

The TMDS line 204 is a high-speed transmission line for transmitting the video data, the audio data, and the auxiliary data from the camera 100 to the television 300.

The CEC line 205 is a transmission line for bidirectionally transmitting various CEC commands between the camera 100 and the television 300. The television 300 can control the camera 100 by transmitting the CEC commands for controlling the camera 100 to the camera 100 through the CEC line 205.

It is to be noted that the connection cable 200 is not limited to the HDMI cable, and may be a communication interface according to standards such as DiiVa, MHL (Mobile High-Definition Link), or Wireless HD (Wireless High Definition). Alternatively, the connection cable 200 may be a communication interface compatible with the HDMI standards. Alternatively, the camera 100 and the television 300 may be ones that establish a network conforming to the HDMI standards using wireless communication. Alternatively, the television 300 may transmit the control commands for controlling the camera 100 using wireless communication.

Camera 100

Next, an example of the configuration of the camera 100 will be described with reference to FIG. 2.

As illustrated in FIG. 2, the camera 100 includes a CPU 101, a memory 102, a communication unit 103, an image pickup unit 104, a recording unit 105, a display unit 106, an operation unit 107, a power supply unit 108, and a ROM 109. The camera 100 will be described hereinafter.

The CPU (Central Processing Unit) 101 controls the camera 100. In addition, the CPU 101 controls the camera 100 in accordance with a CEC command received from the television 300 or controls the camera 100 using a signal input from the operation unit 107. In addition, the CPU 101 analyzes the EDID regarding the television 300 obtained from the television 300 and records a result of the analysis on the memory 102 together with the EDID.

In addition, the CPU 101 includes a timer 101a and a timer 101b. Time measured by the timer 101a will be referred to as the "time T1", and time measured by the timer 101b will be referred to as the "time T2". It is to be noted that a value indicating the time T1 measured by the timer 101a is recorded on the memory 102. In addition, a value indicating the time T2 measured by the timer 101b is recorded on the memory 102.

The memory 102 is a memory that functions as a buffer of the camera 100 and can temporarily record video data, audio data, or the like read by the recording unit 105.

In addition, the memory 102 records a result of an analysis of EDID analyzed by the CPU 101, a result of an analysis of a command analyzed by a command processing unit 103e, and a physical address included in the EDID obtained from the television 300. The physical address recorded on the memory 102 includes information indicating a connection terminal of the television 300 to which the camera 100 is connected through the HDMI cable 200. In addition, the physical address includes information indicating a communication path of the camera 100. The memory 102 is not limited to a RAM (Random Access Memory), and may be an external storage apparatus such as a hard disk apparatus, instead.

The communication unit 103 includes a power output unit 103a, an HPD detection unit 103b, an EDID obtaining unit 103c, a packet transmission unit 103d, and the command processing unit 103e.

The communication unit 103 includes a connection terminal for connecting the HDMI cable 200.

The power output unit 103a generates predetermined power from power supplied from the power supply unit 108. Furthermore, the power output unit 103a outputs the generated predetermined power to the television 300 through the power transmission line 201.

The HPD detection unit 103b detects an HPD signal transmitted from the television 300 through the HPD line 202. When the predetermined power is being supplied to the television 300 from the power output unit 103a through the power transmission line 201, the television 300 judges whether or not the EDID regarding the television 300 can be transmitted to the camera 100. In this case, the television 300 transmits an HPD signal of H level or an HPD signal of L level to the camera 100 in accordance with a result of the judgment. When the predetermined power is being supplied to the television 300 through the power transmission line 201, the television 300 transmits an HPD signal of H level to the camera 100 through the HPD line 202 if the television 300 judges that the EDID can be transmitted to the camera 100. When the HPD detection unit 103b has detected the HPD signal of H level through the HPD line 202, the HPD detection unit 103b notifies the CPU 101 that the EDID regarding the television 300 can be obtained from the television 300.

On the other hand, when the predetermined power is not being supplied from the power output unit 103a to the television 300 through the power transmission line 201, the television 300 transmits an HPD signal of L level to the camera 100 through the HPD line 202. It is to be noted that when the predetermined power is being supplied to the television 300 through the power transmission line 201, the television 300 transmits an HPD signal of L level to the camera 100 through the HPD line 202 if the television 300 judges that the EDID cannot be transmitted to the camera 100. When the HPD detection unit 103b has detected the HPD signal of L level through the HPD line 202, the HPD detection unit 103b notifies the CPU 101 that the EDID regarding the television 300 cannot be obtained from the television 300.

When the HPD signal detected through the HPD line 202 has changed from an HPD signal of H level to an HPD signal of L level, the HPD detection unit 103b notifies the CPU 101 that the HPD signal has changed from the H level to the L level. In addition, when the HPD signal has changed from an HPD signal of L level to an HPD signal of H level, the HPD detection unit 103b notifies the CPU 101 that the HPD signal has changed from the L level to the H level.

When the HPD signal detected by the HPD detection unit 103b is at the H level, the EDID obtaining unit 103c transmits a request to obtain the EDID regarding the television 300 to the television 300 through the DDC line 203 and obtains the EDID regarding the television 300. When the HPD signal detected by the HPD detection unit 103b is at the L level, the EDID obtaining unit 103c does not transmit the request to obtain the EDID regarding the television 300 through the DDC line 203 to the television 300 and does not obtain the EDID regarding the television 300.

The packet transmission unit 103d transmits video data generated by the image pickup unit 104 or video data read by the recording unit 105 from a recording medium 105a to the television 300 through the TMDS line 204. In addition, the packet transmission unit 103d transmits audio data generated by a microphone unit, which is not illustrated, or audio data read by the recording unit 105 from the recording medium 105a to the television 300 through the TMDS line 204. In addition, the packet transmission unit 103d transmits auxiliary data for displaying video data on the television 300, auxiliary data for outputting audio data from the speaker of the television 300, and the like to the television 300 through the TMDS line 204.

The command processing unit 103e receives a CEC command transmitted from the television 300 through the CEC line 205 and analyzes the received CEC command. The command processing unit 103e supplies a result of the analysis of the command to the CPU 101. In this case, the CPU 101 controls the camera 100 in accordance with the result of the analysis of the command supplied from the command processing unit 103e.

In addition, the command processing unit 103e transmits a CEC command for controlling the television 300 to the television 300 through the CEC line 205. It is to be noted that the CEC command for controlling the television 300 is generated by the CPU 101. After transmitting the CEC command for controlling the television 300 to the television 300 through the CEC line 205, the command processing unit 103e receives a response to the camera 100 supplied from the television 300. It is to be noted that the response to the camera 100 from the television 300 may be an Ack response indicating a positive response or a Nack response indicating a negative response.

When the operation mode of the camera 100 is a capture mode, the image pickup unit 104 captures a subject and generates video data from an optical image of the subject. In addition, the image pickup unit 104 includes an image pickup device for capturing a subject, such as a CCD. The video data generated by the image pickup unit 104 may be either moving image data or still image data. The video data generated by the image pickup unit 104 is supplied to the packet transmission unit 103d and the recording unit 105 from the image pickup unit 104. When the EDID obtaining unit 103c has received the EDID regarding the television 300 from the television 300, the image pickup unit 104 converts video data supplied from the image pickup unit 104 to the packet transmission unit 103d into video data suitable for the display performance of the television 300 in accordance with the EDID regarding the television 300.

When the image pickup unit 104 is to generate moving image data, the microphone unit, which is not illustrated, generates audio data. The audio data generated by the microphone unit is supplied from the microphone unit to the packet transmission unit 103d, the recording unit 105, and a speaker unit, which is not illustrated. When the EDID regarding the television 300 has been received from the television 300, the microphone unit converts the audio data supplied from the microphone unit to the packet transmission unit 103d into audio data suitable for the audio performance of the television 300 in accordance with the EDID regarding the television 300. The audio data supplied from the microphone unit to the packet transmission unit 103d is transmitted to the television 300 through the TMDS line 204. The audio data supplied from the microphone unit to the recording unit 105 is recorded on the recording medium 105a. When the operation mode of the camera 100 is a playback mode, the image pickup unit 104 stops capture of a subject and stops generation of video data from an optical image of the subject.

When the operation mode of the camera 100 is the capture mode, the recording unit 105 records the video data generated by the image pickup unit 104 and the audio data generated by the microphone unit on the recording medium 105a. The recording of the video data and the audio data generated by the image pickup unit 104 and the microphone unit, respectively, on the recording medium 105a is controlled by the CPU 101 in accordance with an instruction from the user input through the operation unit 107. The CPU 101 can control the recording of the video data and the audio data generated by the image pickup unit 104 and the microphone unit, respectively, on the recording medium 105a in accordance with a CEC command received from the television 300, instead.

In addition, when the operation mode of the camera 100 is the playback mode, the recording unit 105 reads video data and audio data recorded on the recording medium 105a and supplies the video data and the audio data to the packet transmission unit 103d and the display unit 106. It is to be noted that the video data and the audio data recorded by the recording unit 105 on the recording medium 105a may be video data generated by the image pickup unit 104. In addition, when the operation mode of the camera 100 is the capture mode, the recording unit 105 stops reading of video data and audio data.

It is to be noted that the recording medium 105a may be one that is incorporated into the camera 100 or may be one that can be removed from the camera 100. In addition, data recorded on the recording medium 105a may be still image data, moving image data, or the like, and may be data in which video data and audio data are separately recorded.

The display unit 106 is configured by a display such as a liquid crystal display. When the operation mode of the camera 100 is the capture mode, the display unit 106 displays video data generated by the image pickup unit 104. When the operation mode of the camera 100 is the playback mode, the display unit 106 displays video data played back by the recording unit 105 from the recording medium 105a.

The operation unit 107 provides a user interface for operating the camera 100. The operation unit 107 includes a plurality of buttons for operating the camera 100. The buttons included in the operation unit 107 are configured by switches, a touch panel, or the like.

The power supply unit 108 supplies power necessary for each component of the camera 100 from an AC power supply or a battery, which is not illustrated. When the camera 100 is in a power on state, the power supply unit 108 supplies power necessary for the entirety of the camera 100. When the camera 100 is in a power off state, the power supply unit 108 supplies power at least to the CPU 101, the operation unit 107, and the command processing unit 103e. When the camera 100 is in the power off state, the power supply unit 108 may supply power to the ROM 109, too.

On the ROM (Read Only Memory) 109, programs for controlling the camera 100 are recorded, the programs being to be executed by the CPU 101. In addition, on the ROM 109, thresholds for processes and operations executed by the camera 100, parameters relating to the processes and the operations executed by the camera 100, and the like are recorded. It is to be noted that the ROM 109 may be a storage apparatus such as a hard disk apparatus.

Television 300

Next, an example of the configuration of the television 300 will be described with reference to FIG. 2.

As illustrated in FIG. 2, the television 300 includes a CPU 301, a tuner unit 302, a communication unit 303, a display unit 304, an operation unit 305, a memory 306, a power supply unit 307, a ROM 308, and a remote control signal reception unit 309.

The CPU 301 controls the television 300 in accordance with programs stored in the ROM 308. In addition, the CPU 301 controls the power supply unit 307 such that the power supply unit 307 supplies power to each component or such that the power supply unit 307 stops the supply of power.

The tuner unit 302 receives television broadcast of a television channel selected by the user. The selection of a television channel is performed using the operation unit 305 or the remote control 400.

The memory 306 is a memory that functions as a buffer of the television 300 and can temporarily record video data, audio data, and auxiliary data obtained by the communication unit 303. It is to be noted that the memory 306 is not limited to a RAM, and may be an external storage apparatus such as a hard disk apparatus, instead.

The communication unit 303 includes a power detection unit 303a, an HPD output unit 303b, an EDID output unit 303c, a packet reception unit 303d, and a command processing unit 303e.

The communication unit 303 includes connection terminals for connecting the HDMI cable 200.

The power detection unit 303a is supplied with the predetermined power from the camera 100 through the power transmission line 201. In addition, the power detection unit 303a detects whether or not the predetermined power is being supplied from the camera 100 through the power transmission line 201.

The HPD output unit 303b transmits an HPD signal to the camera 100 through the HPD line 202. When the power detection unit 303a has detected that the predetermined power is being supplied from the camera 100 through the power transmission line 201, the HPD output unit 303b transmits an HPD signal of H level or an HPD signal of L level to the camera 100 through the HPD line 202.

When the power detection unit 303a has detected that the predetermined power is being supplied through the power transmission line 201, the HPD output unit 303b judges whether or not EDID stored in the memory 306 can be transmitted to the camera 100 through the DDC line 203. In the memory 306, pieces of EDID regarding the television 300 corresponding to the connection terminals for connecting HDMI cables are separately stored. When information included in EDID corresponding to a connection terminal to which the camera 100 is connected has not been changed, the HPD output unit 303b judges that the EDID regarding the television 300 corresponding to the connection terminal to which the camera 100 is connected can be transmitted to the camera 100. In this case, in order to notify the camera 100 that the EDID regarding the television 300 can be transmitted to the camera 100 upon receiving a request for the EDID from the camera 100, the HPD output unit 303b transmits an HPD signal of H level to the camera 100 through the HPD line 202. It is to be noted that the request for the EDID is a request to obtain the EDID regarding the television 300.

When the information included in the EDID corresponding to the connection terminal to which the camera 100 is connected has been changed, the HPD output unit 303b judges that the EDID regarding the television 300 corresponding to the connection terminal to which the camera 100 is connected cannot be transmitted to the camera 100. In this case, in order to notify the camera 100 that the EDID regarding the television 300 cannot be transmitted to the camera 100 upon receiving a request for the EDID from the camera 100, the HPD output unit 303b transmits an HPD signal of L level to the camera 100 through the HPD line 202.

In addition, when the power detection unit 303a has detected that the predetermined power is not being supplied from the camera 100 through the power transmission line 201, the HPD output unit 303b transmits an HPD signal of L level to the camera 100 through the HPD line 202.

When the HPD signal transmitted from the HPD output unit 303b to the camera 100 through the HPD line 202 is at the H level, the EDID output unit 303c judges whether or not a request to obtain the EDID has been received from the camera 100.

When the HPD signal transmitted from the HPD output unit 303b to the camera 100 is at the H level and if a request to obtain the EDID has been received from the camera 100, the EDID output unit 303c transmits the EDID regarding the television 300 to the camera 100 through the DDC line 203.

When the HPD signal transmitted from the HPD output unit 303b to the camera 100 is at the L level, the EDID output unit 303c does not transmit the EDID regarding the television 300 to the camera 100 even if a request to obtain the EDID has been received from the camera 100.

It is to be noted that the EDID output unit 303c transmits the EDID regarding the television 300 read from the memory 306 to the camera 100 through the DDC line 203.

The packet reception unit 303d receives video data, audio data, and auxiliary data transmitted from the camera 100 through the TMDS line 204.

The video data received by the packet reception unit 303d from the camera 100 through the TMDS line 204 is recorded on the memory 306 and displayed on the display unit 304. In this case, the audio data received by the packet reception unit 303d from the camera 100 through the TMDS line 204 is recorded on the memory 306 and output from the speaker unit, which is not illustrated. In addition, in this case, the auxiliary data received by the packet reception unit 303d from the camera 100 through the TMDS line 204 is supplied to the CPU 301. The CPU 301 controls the television 300 in accordance with the auxiliary data received from the camera 100.

The command processing unit 303e receives a CEC command transmitted from the camera 100 through the CEC line 205. The command processing unit 303e supplies the CEC command received from the camera 100 to the CPU 301, and the CPU 301 controls the television 300 in accordance with the CEC command received by the command processing unit 303e.

In addition, the command processing unit 303e supplies an Ack response or a Nack response to the camera 100 through the CEC line 205 in accordance with the CEC command received from the camera 100. In addition, the command processing unit 303e transmits a CEC command for controlling the camera 100 to the camera 100 through the CEC line 205. It is to be noted that the CEC command for controlling the camera 100 is generated by the CPU 301 and supplied to the command processing unit 303e from the CPU 301.

It is to be noted that the number of connection terminals for connecting HDMI cables included in the communication unit 303 may be arbitrarily determined for each television 300, and may be two or more. In addition, source apparatuses other than the camera 100 up to the number of connection terminals can be connected to the television 300 through HDMI cables.

The display unit 304 is configured by a display such as a liquid crystal display. The display unit 304 displays video data supplied from at least either the tuner unit 302 or the packet reception unit 303d. When video data received from the camera 100 has been supplied from the packet reception unit 303d, the display unit 304 displays the video data received from the camera 100.

The operation unit 305 provides a user interface for operating the television 300. The operation unit 305 includes a plurality of buttons for operating the television 300, and the CPU 301 controls the television 300 in accordance with an instruction from the user input through the operation unit 305. The buttons included in the operation unit 305 are configured by switches, a touch panel, or the like. The operation unit 305 includes a power button, a channel selection button, and an external input button for operating the television 300.

The power supply unit 307 supplies power necessary for each component of the television 300 from an AC power supply or the like. When the power state of the television 300 is a power on state, the power supply unit 307 supplies power to the entirety of the television 300.

On the ROM 308, programs for controlling the television 300 are recorded, the programs being to be executed by the CPU 301. In addition, on the ROM 308, thresholds for processes and operations executed by the television 300, parameters relating to the processes and the operations executed by the television 300, and the like are recorded. It is to be noted that the ROM 308 may be a storage apparatus such as a hard disk apparatus.

When a remote control signal supplied from the remote control 400 has been obtained, the remote control signal reception unit 309 supplies the obtained remote control signal to the CPU 301. Thus, the remote control signal input from the remote control 400 is input to the CPU 301 through the remote control signal reception unit 309. The CPU 301 can control at least either the television 300 or the camera 100 in accordance with the remote control signal input from the remote control signal reception unit 309. When the camera 100 is to be operated in accordance with the remote control signal input from the remote control signal reception unit 309, the CPU 301 generates a CEC command corresponding to the remote control signal supplied from the remote control signal reception unit 309. The CPU 301 supplies the generated CEC command to the command processing unit 303e. The CEC command supplied to the command processing unit 303e is transmitted to the camera 100 through the CEC line 205. Thus, the user can control the camera 100 using the remote control 400.

Remote Control 400

The remote control 400 provides a user interface for operating at least either the camera 100 or the television 300. The remote control 400 includes a plurality of buttons for operating the camera 100 and a plurality of buttons for operating the television 300. The buttons included in the remote control 400 are configured by switches, a touch panel, or the like.

The remote control 400 includes television operation buttons 400a for operating the television 300. The television operation buttons 400a include, for example, a power button, a channel selection button, and an external input button.

The remote control 400 further includes camera operation buttons 400b for operating the camera 100. The camera operation buttons 400b include, for example, a power button, a playback button, a recording button, a stop button, a pause button, a fast-forward button, a rewind button, a selection button, a menu button, and a cursor button.

The power button of the camera operation buttons 400b is a button for turning on the camera 100 and turning off the camera 100. The playback button of the camera operation buttons 400b is a button for instructing the camera 100 to play back. The recording button of the camera operation buttons 400b is a button for instructing the camera 100 to record. The stop button of the camera operation buttons 400b is a button for instructing the camera 100 to stop either playback or recording executed by the camera 100. The pause button of the camera operation buttons 400b is a button for instructing the camera 100 to pause either playback or recording executed by the camera 100. The fast-forward button of the camera operation buttons 400b is a button for instructing the camera 100 to fast-forward data. The rewind button of the camera operation buttons 400b is a button for instructing the camera 100 to rewind data. The selection button of the camera operation buttons 400b is a button for selecting video data or audio data to be recorded or played back by the camera 100. The menu button of the camera operation buttons 400b is a button for controlling the setting and the display of a menu of the camera 100. It is to be noted that the camera operation buttons 400b may include a button other than the power button, the playback button, the recording button, the stop button, the pause button, the fast-forward button, the rewind button, the selection button, the menu button, and the cursor button.

Remote Operation Process

Figure 3:
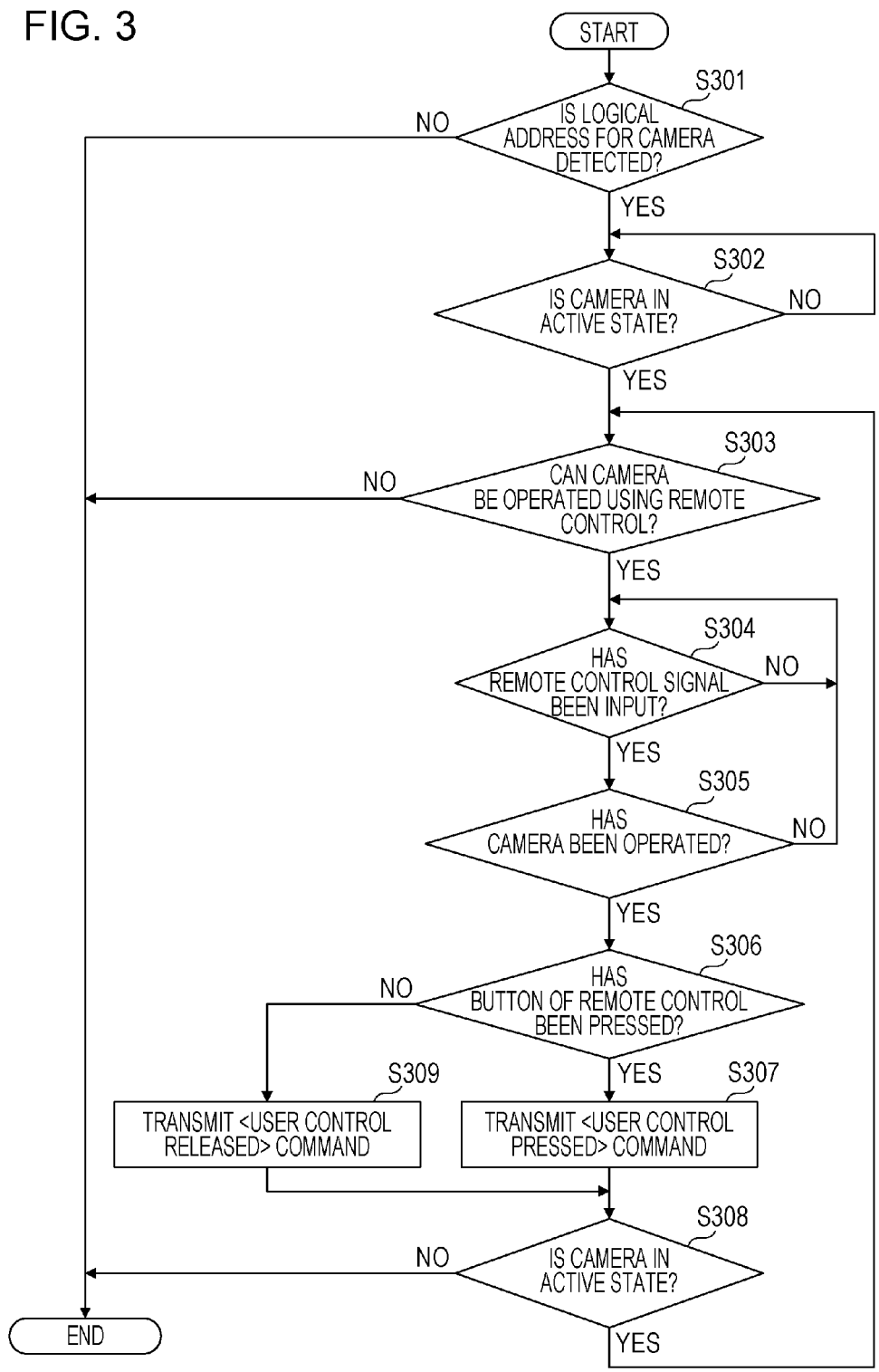
FIG. 3 is an example of a flowchart illustrating a remote operation process according to the first embodiment of the present invention.

Next, a remote operation process for remotely operating the camera 100 using the remote control 400 and the television 300 will be described with reference to a flowchart of FIG. 3. It is to be noted that the remote operation process illustrated in FIG. 3 is a process executed by the television 300 when the remote control 400 has been operated. The remote operation process illustrated in FIG. 3 is a process executed by the television 300 by executing a program recorded on the ROM 308 using the CPU 301. It is to be noted that the CPU 301 may execute the remote operation process illustrated in FIG. 3 by executing a program supplied to the memory 306 or a memory of the CPU 301, which is not illustrated, through a server or an OS (operating system), instead. It is to be noted that the remote operation process illustrated in FIG. 3 will be described hereinafter while assuming that the camera 100 and the television 300 are connected to each other through the HDMI cable 200.

In S301, the CPU 301 detects whether or not a logical address corresponding to the device type of the camera 100 has been assigned to the camera 100.

The logical address corresponding to the device type of the camera 100 is, for example, any of logical addresses "1", "2", "3", "4", "6", "7", "8", "9", "10", and "11" defined in the CEC protocol. If a logical address corresponding to the device type of the camera 100 has been assigned to the camera 100, the television 300 can execute control for causing the camera 100 to execute a particular process using a CEC command. If a logical address corresponding to the device type of the camera 100 has not been assigned to the camera 100, the television 300 cannot execute control for causing the camera 100 to execute a particular process using a CEC command. In this case, even if the user performs an operation on the camera 100 using the remote control 400, a CEC command corresponding to a remote control signal input to the remote control signal reception unit 309 from the remote control 400 is not transmitted to the camera 100 from the television 300.

Therefore, if the CPU 301 detects that a logical address corresponding to the device type of the camera 100 has not been assigned to the camera 100 (NO in S301), the user cannot operate the camera 100 using the remote control 400. If the CPU 301 detects that a logical address corresponding to the device type of the camera 100 has not been assigned to the camera 100 (NO in S301), the flowchart ends. If the CPU 301 detects that a logical address corresponding to the device type of the camera 100 has been assigned to the camera 100 (YES in S301), the flowchart proceeds from S301 to S302.

In S302, the CPU 301 judges whether or not the camera 100 is in an active state. For example, the CPU 301 judges whether or not the command processing unit 303e has received an <Active Source> command from the camera 100 through the CEC line 205. If the command processing unit 303e has received an <Active Source> command from the camera 100, the CPU 101 judges that the camera 100 is in the active state. If the command processing unit 303e has not received an <Active Source> command from the camera 100, the CPU 101 judges that the camera 100 is not in the active state. In addition, if the command processing unit 303e has received an <Active Source> command from a source apparatus other than the camera 100, the CPU 101 judges that the camera 100 is not in the active state.

If the CPU 301 judges that the camera 100 is in the active state (YES in S302), the flowchart proceeds from S302 to S303. If the CPU 301 judges that the camera 100 is not in the active state (NO in S302), the flowchart returns from S302 to S302. It is to be noted that if the camera 100 is not in the active state (NO in S302), the CPU 301 may judge that the camera 100 need not be operated using the remote control 400 and may end the flowchart.

In S303, the CPU 301 judges whether or not the camera 100 can be operated using the remote control 400 in accordance with the setting of the television 300. If the CPU 301 judges that the camera 100 can be operated using the remote control 400 (YES in S303), the flowchart proceeds from S303 to S304. If the CPU 301 judges that the camera 100 cannot be operated using the remote control 400 (NO in S303), the flowchart ends.

In S304, the CPU 301 judges whether or not a remote control signal has been input to the remote control signal reception unit 309 from the remote control 400. When a button included in the remote control 400 has been pressed, a remote control signal is input to the remote control signal reception unit 309 from the remote control 400. When a button included in the remote control 400 has been released from a pressed state, a remote control signal is input to the remote control signal reception unit 309 from the remote control 400.

If the CPU 301 judges that a remote control signal has been input to the remote control signal reception unit 309 from the remote control 400 (YES in S304), the flowchart proceeds from S304 to S305. If the CPU 301 judges that a remote control signal has not been input to the remote control signal reception unit 309 from the remote control 400 (NO in S304), the flowchart returns from S304 to S304.

In S305, the CPU 301 judges whether or not the camera operation buttons 400b of the remote control 400 have been operated in accordance with the remote control signal input to the remote control signal reception unit 309 from the remote control 400. If the CPU 301 judges that the camera operation buttons 400b of the remote control 400 have been operated (YES in S305), the flowchart proceeds from S305 to S306. If the CPU 301 judges that the camera operation buttons 400b of the remote control 400 have not been operated (NO in S305), the CPU 301 judges that the television operation buttons 400a of the remote control 400 have been operated. In this case, the CPU 301 controls the television 300 in accordance with the remote control signal input to the remote control signal reception unit 309. If the CPU 301 judges that the camera operation buttons 400b of the remote control 400 have not been operated (NO in S305), the flowchart return from S305 to S304.

In S306, the CPU 301 judges whether or not the camera operation buttons 400b have been pressed in accordance with the remote control signal input to the remote control signal reception unit 309 from the remote control 400. If the CPU 301 judges that the camera operation buttons 400b have been pressed (YES in S306), the flowchart proceeds from S306 to S307. If the CPU 301 judges that the camera operation buttons 400b have not been pressed (NO in S306), the CPU 301 judges that the camera operation buttons 400b have been released from a pressed state. If the CPU 301 judges that the camera operation buttons 400b have not been pressed (NO in S306), the flowchart proceeds from S306 to S309.

It is to be noted that in S306, the CPU 301 may judge whether or not an instruction for causing the camera 100 to execute a particular process has been input from the remote control 400 in accordance with the remote control signal input to the remote control signal reception unit 309 from the remote control 400. In this case, if the CPU 301 judges that an instruction for causing the camera 100 to execute a particular process has not been input from the remote control 400 (NO in S306), the flowchart proceeds from S306 to S309. In this case, if the CPU 301 judges that an instruction for causing the camera 100 to execute a particular process has been input from the remote control 400 (YES in S306), the flowchart proceeds from S306 to S307. In S307, the CPU 301 controls the command processing unit 303e such that a <User Control Pressed> command is transmitted to the camera 100 through the CEC line 205 in accordance with the remote control signal input to the remote control signal reception unit 309.

In this case, the CPU 301 detects which one of the camera operation buttons 400b has been pressed in accordance with the remote control signal input to the remote control signal reception unit 309 from the remote control 400. As a result, the CPU 301 generates a <User Control Pressed> command including information indicating a process corresponding to one of the camera operation buttons 400b that has been operated in accordance with the CEC protocol, and supplies the <User Control Pressed> command to the command processing unit 303e. Furthermore, the CPU 301 controls the command processing unit 303e such that the generated <User Control Pressed> command is transmitted to the camera 100 through the CEC line 205. It is to be noted that the <User Control Pressed> command is a CEC command defined in the CEC protocol. In addition, the <User Control Pressed> command indicates that a particular button of the remote control 400 has been pressed. In addition, the <User Control Pressed> command indicates that the remote control 400 has instructed the camera 100 to execute a particular process.

It is to be noted that, for example, when the playback button of the camera operation buttons 400b has been pressed, the CPU 301 transmits a <User Control Pressed> command including information for instructing the camera 100 to play back to the camera 100 in S307.

In addition, for example, when the recording button of the camera operation buttons 400b has been pressed, the CPU 301 transmits a <User Control Pressed> command including information for instructing the camera 100 to record to the camera 100 in S307.

In addition, for example, when the fast-forward button of the camera operation buttons 400b has been pressed, the CPU 301 transmits a <User Control Pressed> command including information for instructing the camera 100 to fast-forward to the camera 100 in S307.

In addition, for example, when the rewind button of the camera operation buttons 400b has been pressed, the CPU 301 transmits a <User Control Pressed> command including information for instructing the camera 100 to rewind to the camera 100 in S307.

It is to be noted that the information included in the <User Control Pressed> command may be at least any of the information for instructing the camera 100 to play back, the information for instructing the camera 100 to record, the information for instructing the camera 100 to fast-forward, and the information for instructing the camera 100 to rewind. In addition, the information included in the <User Control Pressed> command may be information other than the information for instructing the camera 100 to play back, the information for instructing the camera 100 to record, the information for instructing the camera 100 to fast-forward, and the information for instructing the camera 100 to rewind. For example, the information included in the <User Control Pressed> command may be information for causing the camera 100 to begin to capture at least either moving image data or still image data, or may be information for causing the camera 100 to begin to transmit data.

When the <User Control Pressed> command has been transmitted to the camera 100, the flowchart proceeds from S307 to S308.

In S308, the CPU 301 judges, as in S302, whether or not the camera 100 is in the active state. If the CPU 301 judges that the camera 100 is in the active state (YES in S308), the flowchart returns from S308 to S303. If the CPU 301 judges that the camera 100 is not in the active state (NO in S308), the flowchart ends.

In S309, the CPU 301 controls the command processing unit 303e such that a <User Control Released> command is transmitted to the camera 100 through the CEC line 205 in accordance with the remote control signal input to the remote control signal reception unit 309.

In this case, the CPU 301 detects which one of the camera operation buttons 400b has been released from a pressed state in accordance with the remote control signal input to the remote control signal reception unit 309 from the remote control 400. As a result, the CPU 301 generates a Control Released> command including information indicating a process corresponding to one of the camera operation buttons 400b that has been released from an operation in accordance with the CEC protocol, and supplies the <User Control Released> command to the command processing unit 303e. Furthermore, the CPU 301 controls the command processing unit 303e such that the generated <User Control Released> command is transmitted to the camera 100 through the CEC line 205. It is to be noted that the <User Control Released> command is a CEC command defined in the CEC protocol. In addition, the <User Control Released> command indicates that a particular button of the remote control 400 has been released from a pressed state. In addition, the <User Control Released> command indicates that an instruction for the camera 100 to execute a particular process input from the remote control 400 has been released.

It is to be noted that, for example, when the playback button of the camera operation buttons 400b has been released, the CPU 301 transmits a <User Control Released> command including information for instructing the camera 100 to stop playback to the camera 100 in S309.

In addition, for example, when the recording button of the camera operation buttons 400b has been released, the CPU 301 transmits a <User Control Released> command including information for instructing the camera 100 to stop recording to the camera 100 in S309.

In addition, for example, when the fast-forward button of the camera operation buttons 400b has been released, the CPU 301 transmits a <User Control Released> command including information for instructing the camera 100 to stop fast-forward to the camera 100 in S309.

In addition, for example, when the rewind button of the camera operation buttons 400b has been released, the CPU 301 transmits a <User Control Released> command including information for instructing the camera 100 to stop rewind to the camera 100 in S309.

It is to be noted that the information included in the <User Control Released> command may be at least any of the information for instructing the camera 100 to stop playback, the information for instructing the camera 100 to stop recording, the information for instructing the camera 100 to stop fast-forward, and the information for instructing the camera 100 to stop rewind. In addition, the information included in the <User Control Released> command may be information other than the information for instructing the camera 100 to stop playback, the information for instructing the camera 100 to stop recording, the information for instructing the camera 100 to stop fast-forward, and the information for instructing the camera 100 to stop rewind. For example, the information included in the <User Control Released> command may be information for causing the camera 100 to stop capturing at least either moving image data or still image data, or may by information for causing the camera 100 to stop transmitting data.

When the <User Control Released> command has been transmitted to the camera 100, the flowchart proceeds from S309 to S308.

It is to be noted that the CPU 301 may execute the processing in S303 after executing the processing in S301 without executing the processing in S302.

The television 300 according to the first embodiment is configured to execute the remote operation process illustrated in FIG. 3. Therefore, the camera 100 executes a process desired by the user on the television 300 in accordance with the <User Control Pressed> command and the <User Control Released> command transmitted from the television 300. In this case, when the command processing unit 103e has received the <User Control Pressed> command, the camera 100 begins a process corresponding to the information included in the <User Control Pressed> command. On the other hand, when the command processing unit 103e has received the <User Control Released> command, the camera 100 stops a process corresponding to the information included in the <User Control Released> command. For example, when the information indicating an instruction for the camera 100 to fast-forward is included in the <User Control Pressed> command received by the command processing unit 103e, the camera 100 executes a process for fast-forwarding data recorded in the camera 100. In addition, when the information indicating an instruction for the camera 100 to stop fast-forward is included in the <User Control Released> command received by the command processing unit 103e, the camera 100 stops fast-forwarding data recorded in the camera 100. It is to be noted that a process corresponding to the information included in the <User Control Pressed> command received by the command processing unit 103e will be referred to as the "predetermined process".

However, a television connected to the camera 100 though an HDMI cable might be an apparatus that does not transmit a <User Control Released> command to the camera 100 even when a button included in the camera operation buttons 400b has been released from a pressed state. In this case, the camera 100 cannot detect whether or not one of the camera operation buttons 400b operated by the user has been released from a pressed state. Therefore, the camera 100 cannot detect the timing at which the predetermined process is to be stopped when the camera 100 is executing the predetermined process. In this case, even if the user is not already performing an operation on the camera operation buttons 400b, the camera 100 continues to execute the predetermined process. As a result, a situation in which a process that is not intended by the user is executed by the camera 100 arises.

Figure 4:
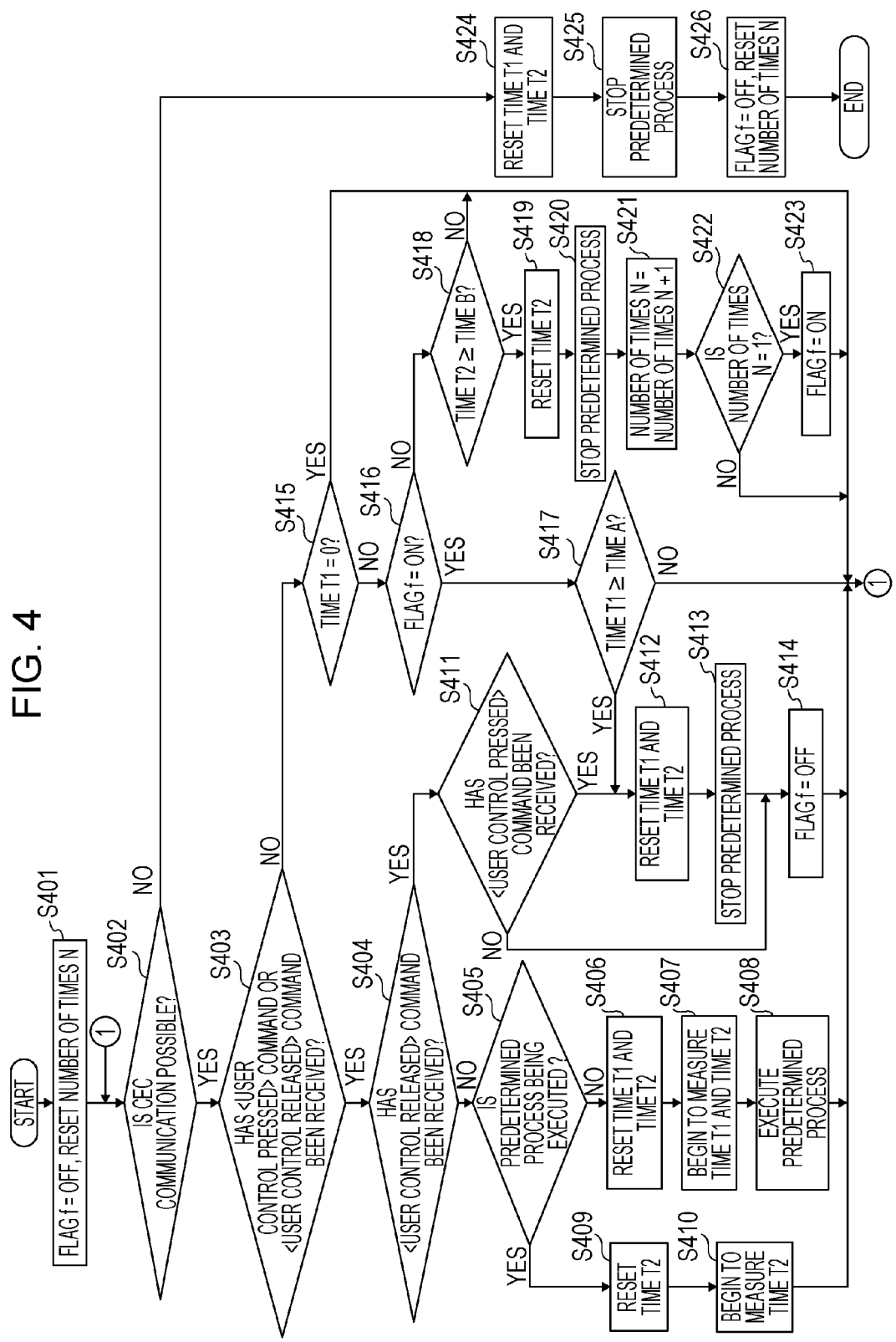
FIG. 4 is an example of a flowchart illustrating a control process according to the first embodiment of the present invention.

In order to avoid such a situation, the camera 100 executes a control process illustrated in FIG. 4, so that a process that is not intended by the user is not performed even when the camera 100 has been connected to an apparatus that transmits a <User Control Pressed> command but does not transmit a <User Control Released> command to the camera 100.

By performing the control process illustrated in FIG. 4, the camera 100 can make it possible that a process that is not intended by the user is not performed when the user operates the camera 100 using an external apparatus.

Control Process

Next, the control process executed by the camera 100 will be described with reference to a flowchart of FIG. 4. It is to be noted that the control process illustrated in FIG. 4 is a process executed by the camera 100 by executing a program recorded on the ROM 109 using the CPU 101. It is to be noted that the CPU 101 may execute the control process illustrated in FIG. 4 by executing a program supplied to the memory 102 though the server or the OS, instead.

In S401, the CPU 101 sets a flag f recorded on the memory 102 such that the flag f becomes off, and resets the value of the number of times N recorded on the memory 102. It is to be noted that the flag f is information indicating whether or not the television 300 transmits a <User Control Released> command to the camera 100. When the flag f is off, the CPU 101 judges that the television 300 is an apparatus that transmits a <User Control Released> command to the camera 100. When the flag f is on, the CPU 101 judges that the television 300 is an apparatus that does not transmit a <User Control Released> command to the camera 100. It is to be noted that the number of times N will be described later.

When the flag f has become off and the number of times N has been reset, the flowchart proceeds from S401 to S402.

In S402, the CPU 101 judges whether or not the command processing unit 103e can communicate with the television 300 through the CEC line 205.

For example, after the command processing unit 103e transmits a <Polling Message> command to the television 300, the CPU 101 judges whether or not the command processing unit 103e has received an Ack response. The CPU 101 may judge whether or not the command processing unit 103e can communicate with the television 300 through the CEC line 205 in accordance with a result of the judgment. In this case, if the command processing unit 103e has not received an Ack response after the <Polling Message> command is transmitted to the television 300, the CPU 101 judges that the command processing unit 103e cannot communicate with the television 300 through the CEC line 205.

Furthermore, the CPU 101 may judge whether or not the command processing unit 103e can communicate with the television 300 through the CEC line 205 in accordance with whether or not a logical address corresponding to the camera 100 has been obtained. In this case, when a logical address corresponding to the camera 100 has not been obtained, the CPU 101 judges that the command processing unit 103e cannot communicate with the television 300 through the CEC line 205.

Furthermore, the CPU 101 may judge whether or not the command processing unit 103e can communicate with the television 300 through the CEC line 205 in accordance with whether or not a physical address has been obtained. In this case, when a physical address corresponding to the camera 100 has not been obtained, the CPU 101 judges that the command processing unit 103e cannot communicate with the television 300 through the CEC line 205.

Furthermore, the CPU 101 may judge whether or not the command processing unit 103e can communicate with the television 300 through the CEC line 205 in accordance with whether or not the HPD detection unit 103b has detected an HPD signal of H level. In this case, when the HPD detection unit 103b has not detected an HPD signal of H level, the CPU 101 judges that the command processing unit 103e cannot communicate with the television 300 through the CEC line 205.

It is to be noted that when the command processing unit 103e has received an Ack response in response to the <Polling Message> command, a logical address corresponding to the camera 100 has been obtained, a physical address has been obtained, the HPD detection unit 103b has detected an HPD signal of H level, and an <Active Source> command has been transmitted to the television 300, the CPU 101 judges that the command processing unit 103e can communicate with the television 300 through the CEC line 205. It is to be noted that when the command processing unit 103e has received an Ack response to the <Polling Message> command, a logical address corresponding to the camera 100 has been obtained, a physical address has been obtained, the HPD detection unit 103b has detected an HPD signal of H level, and an <Active Source> command has been transmitted to the television 300, the CPU 101 may further transmit to a <Menu Status> command to the television 300. The <Active Source> command is a CEC command used to execute One Touch Play defined in the CEC protocol.

If the CPU 101 judges that the command processing unit 103e can communicate with the television 300 through the CEC line 205 (YES in S402), the flowchart proceeds from S402 to S403. If the CPU 101 judges that the command processing unit 103e cannot communicate with the television 300 through the CEC line 205 (NO in S402), the flowchart proceeds from S402 to S424.

In S403, the CPU 101 judges whether or not the command processing unit 103e has received either a <User Control Pressed> command or a <User Control Released> command from the television 300. If the command processing unit 103e has received either a <Use Control Pressed> command or a <User Control Released> command (YES in S403), the flowchart proceeds from S403 to S404. If the command processing unit 103e has not received a <User Control Pressed> command nor a <User Control Released> command from the television 300 (NO in S403), the flowchart proceeds from S403 to S415.

In S404, the CPU 101 judges whether or not the command received by the command processing unit 103e from the television 300 in S403 is a <User Control Released> command. If the CPU 101 judges that the command processing unit 103e has received a <User Control Released> command from the television 300 through the CEC line 205 (YES in S404), the flowchart proceeds from S404 to S411. If the command processing unit 103e has not received a <User Control Released> command (NO in S404), the CPU 101 judges that the command processing unit 103e has received a <User Control Pressed> command. If the CPU 101 judges that the command processing unit 103e has not received a <User Control Released> command from the television 300 through the CEC line 205 (NO in S404), the flowchart proceeds from S404 to S405.

In S405, the CPU 101 judges whether or not a process corresponding to information included in the <User Control Pressed> command received by the command processing unit 103e in S403, that is, a predetermine process, is being executed. If the CPU 101 judges that the predetermined process is being executed (YES in S405), the flowchart proceeds from S405 to S409. If the CPU 101 judges that the predetermined process is not being executed (NO in S405), the flowchart proceeds from S405 to S406.

In S406, the CPU 101 resets the time T1 measured by the timer 101a and the time T2 measured by the timer 101b. In S406, the CPU 101 sets values indicating the time T1 and the time T2 recorded on the memory 102 to 0. In this case, the flowchart proceeds from S406 to S407.

In S407, the CPU 101 begins to measure the time elapsed since the command processing unit 103e received the <User Control Pressed> command from the television 300. Therefore, the CPU 101 controls the timer 101a such that the timer 101a measures the time T1 and controls the timer 101b such that the timer 101b measures the time T2. In this case, the flowchart proceeds from S407 to S408.

In S408, the CPU 101 executes the process corresponding to the <User Control Pressed> command received by the command processing unit 103e in S403, that is, the predetermined process. The CPU 101 executes the predetermined process in accordance with the information included in the <User Control Pressed> command. In this case, the flowchart returns from S408 to S402.

If it is judged that the predetermined process is being executed (YES in S405), the CPU 101 judges that the command processing unit 103e has received the <User Control Pressed> command from the television 300 at least once while the predetermined process is already being executed.

In this case, in S409, the CPU 101 resets the time T2 measured by the timer 101b. It is to be noted that the CPU 101 does not reset the time T1 measured by the timer 101a. In S409, the CPU 101 sets the value indicating the time T2 recorded on the memory 102 to 0. In this case, the flowchart proceeds from S409 to S410.

In S410, the CPU 101 controls the timer 101b such that the timer 101b measures the time T2. In this case, the flowchart returns from S410 to S402.

It is to be noted that every time the command processing unit 103e receives the <User Control Pressed> command, the CPU 101 restarts the measurement of the time T2 from the beginning in the process in S409 and S410. It is to be noted that after the measurement of the time T1 begins, the CPU 101 does not restart the measurement of the time T1 from the beginning even if the command processing unit 103e has received the <User Control Pressed> command. The CPU 101 may control the timer 101a such that the timer 101a measures the time elapsed since the predetermined process began.

In S411, the CPU 101 judges whether or not the command processing unit 103e had received a <User Control Pressed> command from the television 300 before the command processing unit 103e received the <User Control Released> command in S403. If a <User Control Pressed> command had been received from the television 300 before the <User Control Released> command was received (YES in S411), the flowchart proceeds from S411 to S412. If a <User Control Pressed> command had not been received from the television 300 before the <User Control Released> command was received (NO in S411), the flowchart proceeds from S411 to S414.

In S412, the CPU 101 reset, as in S406, the time T1 measured by the timer 101a and resets the time T2 measured by the timer 101b. In this case, the CPU 101 sets the value indicating the time T1 and the value indicating the time T2 recorded on the memory 102 to 0. In this case, the flowchart proceeds from S412 to S413.

In S413, the CPU 101 stops a predetermined process that is being executed by the camera 100. The predetermined process stopped by the CPU 101 in S413 is a process corresponding to information included in the <User Control Pressed> command received by the command processing unit 103e before the <User Control Released> command is received. Furthermore, the CPU 101 deletes parameters and information relating to the stopped predetermined process. In this case, the flowchart proceeds from S413 to S414.

In S414, the CPU 101 sets the flag f recorded on the memory 102 such that the flag f becomes off. When the flag f has become off, the flowchart returns from S414 to S402.

In S415, the CPU 101 judges whether or not the time T1 measured by the timer 101a is 0. If the time T1 measured by the timer 101a is 0, it is assumed that the predetermined process is not being executed by the camera 100. In addition, in this case, it is assumed that the command processing unit 103e has not received a <User Control Pressed> command from the television 300. Therefore, the camera 100 can detect that the user has not perform an operation on the camera 100 using the remote control. If the time T1 measured by the timer 101a is 0 (YES in S414), the flowchart returns from S415 to S402.

On the other hand, if the time T1 measured by the timer 101a is not 0, it means that the time T1 is being measured by the timer 101a. In this case, it is assumed that the camera 100 is executing the predetermined process. In addition, in this case, it is assumed that the command processing unit 103e has not received a <User Control Released> command after the communication unit 103 received a <User Control Pressed> command.

Currently, the CPU 101 continues to execute the predetermined process until the command processing unit 103e receives a <User Control Released> command after the command processing unit 103e receives a <User Control Pressed> command. In this case, when the command processing unit 103e has received a <User Control Released> command, the CPU 101 executes control such that the predetermined process stops. However, a television connected to the camera 100 through an HDMI cable might be an apparatus that does not transmit a <User Control Released> command to the camera 100 even when an operation for controlling the camera 100 input to the remote control 400 has been released. The camera 100 connected to such a television cannot detect the timing at which control is to be executed such that the predetermined process stops.

In such a case, when the user is not already operating the camera 100 using the remote control 400, the camera 100 cannot detect whether or not the television 300 is an apparatus that transmits a <User Control Released> command to the camera 100. In addition, the camera 100 cannot detect whether or not the reason why the television 300 does not transmit a <User Control Released> command to the camera 100 is that the user is still performing an operation on the camera 100 using the remote control 400.

Therefore, since the CPU 101 executes control such that the predetermined process does not stop even when the user is not operating the camera 100 using the remote control 400, the camera 100 might execute a process that is not intended by the user. In order to avoid such a situation, if the time T1 measured by the timer 101a is not (NO in S415), the flowchart proceeds from S415 to S416.

In S416, the CPU 101 detects whether or not the flag f stored in the memory 102 is on. If the CPU 101 detects that the flag f stored in the memory 102 is on (YES in S416), the flowchart proceeds from S416 to S417. If the CPU 101 detects that the flag f stored in the memory 102 is not on (NO in S416), the flowchart proceeds S416 to S418.

In S417, the CPU 101 detects whether or not the time T1 measured by the timer 101a is equal to or longer than a predetermined time A. It is to be noted that the predetermined time A is a threshold stored in the ROM 109 in advance. If the CPU 101 detects that the time T1 measured by the timer 101a is equal to or longer than the predetermined time A (YES in S417), the flowchart proceeds from S417 to S412. If the CPU 101 detects that the time T1 measured by the timer 101a is not equal to or longer than the predetermined time A (NO in S417), the flowchart returns from S417 to S402.

In S418, the CPU 101 detects whether or not the time T2 measured by the timer 101b is equal to or longer than a predetermined time B. It is to be noted that the predetermined time B is a threshold stored in the ROM 109 in advance. In addition, the predetermined time B is a time described in the HDMI standards, and the predetermined time B disclosed in the HDMI standards is 560 ms. In addition, the predetermined time B is longer than the predetermined time A. In addition, the predetermined time A is shorter than the predetermined time B, and may be any time insofar as the predetermined time A is longer than 0 ms. If the CPU 101 detects that the time T2 measured by the timer 101b is equal to or longer than the predetermined time B (YES in S418), the flowchart proceeds from S418 to S419. If the CPU 101 detects that the time T2 measured by the timer 101b is not equal to or longer than the predetermined time B (NO in S418), the flowchart returns from S418 to S402.

In S419, the CPU 101 resets the time T2 measured by the timer 101b. The CPU 101 sets the value indicating the time T2 recorded on the memory 102 to 0. In this case, the flowchart proceeds from S419 to S420.

In S420, the CPU 101 executes, as in S413, control such that the predetermined process stops. In this case, too, the CPU 101 deletes the parameters and the information relating to the predetermined process. It is to be noted that, in this case, the CPU 101 may reset the time T1 measured by the timer 101a and set the value indicating the time T1 recorded on the memory 102 to 0. In this case, the flowchart proceeds from S420 to S421.

In S421, the CPU 101 executes control such that the value of the number of times N recorded on the memory 102 increases. It is to be noted that the number of times N is information indicating the number of times that a process for stopping the predetermined process has been performed when the time T2 is equal to or longer than the predetermined time B. It is to be noted that if the time T2 is equal to or longer than the time B (YES in S418), the CPU 101 adds 1 to the value of the number of times N after executing the process in S419 and S420. When the value of the number of times N has increased, the flowchart proceeds from S421 to S422.

In S422, the CPU 101 judges whether or not the value of the number of times N recorded on the memory 102 is 1. If the CPU 101 judges that the value of the number of times N is 1 (YES in S422), the flowchart proceeds from S422 to S423. If the CPU 101 judges that the value of the number of times N is not 1 (NO in S422), it means that it is judged that the number of time N is equal to or larger than 2. In this case (NO in S422), the flowchart returns from S422 to S402.

In S423, the CPU 101 sets the flag f recorded on the memory 102 such that the flag f becomes on. When the flag f has become on, the flowchart returns from S423 to S402.

It is to be noted that when the flag f has become on in the process in S423, the CPU 101 does not execute the process in S418, S419, S420, S421, S422, and S423 thereafter until the flag f becomes off. In doing so, the CPU 101 executes the process in S417 until the flag f becomes off, and controls whether or not to execute the process in S412, S413, and S414.

If the value of the number of times N is 1 (YES in S422), the CPU 101 can judge that the television 300 is an apparatus that does not transmit a <User Control Released> command to the camera 100 in the process in S423. Therefore, the CPU 101 executes the process in S417 to control whether or not to execute the process in S412, S413, and S414. As a result, the camera 100 can automatically stop the predetermined process even when the television 300 is an apparatus that does not transmit a <User Control Released> command.

If the value of the number of times N is not 1 (NO in S422), it is assumed that the television 300 is an apparatus that transmits a <User Control Released> command to the camera 100 but does not actually transmit the <User Control Released> command. In this case, the user might be operating the camera 100 using the remote control 400, and therefore the CPU 101 does not execute the process in S417, S412, S413, and S414 and executes the process in S418, S419, S420, and S422. In this case, the CPU 101 continues to execute the predetermined process corresponding to the <User Control Pressed> command until it is judged that the time T2 is equal to or longer than the predetermined time B.

In S424, the CPU 101 resets, as in S406, the time T1 measured by the timer 101a and resets the time T2 measured by the timer 101b. The CPU 101 sets the value indicating the time T1 and the value indicating the time T2 recorded on the memory 102 to 0. In this case, the flowchart proceeds from S424 to S425.

In S425, the CPU 101 stops the predetermined process as in S413. In this case, too, the CPU 101 deletes the parameters and the information relating to the predetermined process. In this case, the flowchart proceeds from S425 to S426.

It is to be noted that, in S425, since the camera 100 cannot communicate with the television 300 through the CEC line 205, the CPU 101 judges that the predetermined process corresponding to the <User Control Pressed> command need not be performed. In S426, the CPU 101 sets the flag f recorded on the memory 102 such that the flag f becomes off, and resets the number of times N. The CPU 101 sets the value of the number of the times N recorded on the memory 102 to 0. When the flag f has become off and the number of times N has been reset, the flowchart ends.

Thus, the communication apparatus 100 according to the first embodiment is configured to detect whether or not an external apparatus is an apparatus that transmits a <User Control Released> command.

If the external apparatus is an apparatus that does not transmit a <User Control Released> command, the communication apparatus 100 executes control for stopping a process specified by a <User Control Pressed> command.

If the external apparatus is not an apparatus that transmits a <User Control Released> command, the communication apparatus 100 stops the process specified by the <User Control Pressed> command received from the external apparatus when the predetermined time A has elapsed. In this case, the communication apparatus 100 automatically stops the process specified by the <User Control Pressed> command received from the external apparatus even when a <User Control Released> command has not been transmitted. Therefore, even when the user is not operating the communication apparatus 100 using the remote control 400, the communication apparatus 100 can avoid executing a process that is not intended by the user.

If the external apparatus is an apparatus that transmits a <User Control Released> command, the communication apparatus 100 executes control for stopping a process specified by a <User Control Pressed> command. If the external apparatus is an apparatus that transmits a <User Control Released> command, the communication apparatus 100 stops the process specified by the <User Control Pressed> command received from the external apparatus when the predetermined time B has elapsed. In this case, when the user is operating the communication apparatus 100 using the remote control 400, the communication apparatus 100 does not stop the process specified by the <User Control Pressed> command even when the predetermined time A has elapsed. In this case, since the process specified by the <User Control Pressed> command is stopped when the predetermined time B has elapsed, the communication apparatus 100 can avoid executing a process that is not intended by the user.

It is to be noted that if the command processing unit 103e has received a <User Control Released> command (YES in S411), the communication apparatus 100 is configured to set the flag f to off in S414. In addition, if the time T2 is equal to or longer than the predetermined time B (YES in S418) and the value of the number of times N is 1 (YES in S422), the communication apparatus 100 is configured to set the flag f to on in S423.

In doing so, the communication apparatus 100 can detect whether or not the external apparatus is an apparatus that transmits a <User Control Released> command to the communication apparatus 100 in accordance with the flag f.

In S422, the CPU 101 is configured to judge whether or not the value of the number of times N recorded on the memory 102 is 1. However, the present invention is not limited to this. For example, in S422, the CPU 101 may judge whether or not the value of the number of times N recorded on the memory 102 is equal to or larger than a predetermined number of times M. In this case, if the CPU 101 judges that the value of the number of times N is equal to or larger than the predetermined number of times M (YES in S422), the flowchart proceeds from S422 to S423. If the CPU 101 judges that the value of the number of times N is not equal to or larger than the predetermined number of times M (NO in S422), the flowchart returns from S422 to S402. It is to be noted that the predetermined number of times M may be any number insofar as the predetermined number of times M is equal to or larger than 1.

It is to be noted that the communication apparatus 100 may detect whether or not the external apparatus is an apparatus that transmits a <User Control Released> command by making an inquiry using a CEC command, instead. If it is detected using a CEC command that the external apparatus is an apparatus that does not transmit a <User Control Released> command, the communication apparatus 100 sets the flag f to on.

In addition, the communication apparatus 100 may detect whether or not the external apparatus is an apparatus that transmits a <User Control Released> command using EDID or information obtained from the external apparatus, instead. If it is detected using EDID that the external apparatus is an apparatus that does not transmit a <User Control Released> command, the communication apparatus 100 sets the flag f to on.

Although the predetermined time A and the predetermined time B are thresholds stored in the ROM 109 in advance in the first embodiment, the predetermined time A and the predetermined time B may be thresholds that can be changed by the user, instead. In addition, the predetermined time B may be a time different from the time described in the HDMI standards insofar as the predetermined time B is longer than the predetermined time A.

It is to be noted that the remote control 400 is configured to include the television operation buttons 400a and the camera operation buttons 400b. However, when the remote control 400 includes a touch panel, the remote control 400 may display a GUI (graphical user interface) corresponding to the television operation buttons 400a and a GUI corresponding to the camera operation buttons 400b on the touch panel. In this case, when the GUI corresponding to the camera operation buttons 400b displayed on the touch panel of the remote control 400 has been operated by the user, the remote control 400 and the television 300 execute the same operation as that performed when the camera operation buttons 400b have been pressed by the user. When the GUI corresponding to the camera operation buttons 400b displayed on the touch panel of the remote control 400 is no longer being operated by the user, the television 300 and the remote control 400 execute the same operation as that performed when the camera operation buttons 400b have been released from a pressed state.

Alternatively, the camera operation buttons 400b may be switches. It is to be noted that although the camera operation buttons 400b are configured to be included in the remote control 400, the camera operation buttons 400b may be included in the operation unit 305 of the television 300, instead. When the camera operation buttons 400b included in the operation unit 305 have been operated by the user, the television 300 and the camera 100 execute the same process as that performed when the camera operation buttons 400b of the remote control 400 have been operated.

In addition, in the first embodiment, the communication apparatus 100 may be an apparatus that functions as an HDMI repeater insofar as the television 300 is an apparatus having a function as an HDMI sink.

In the first embodiment, when the camera operation buttons 400b of the remote control 400 have been operated, the television 300 transmits a <User Control Pressed> command to the camera 100. However, in this case, the television 300 may transmit a Vendor command including information indicating a process corresponding to one of the camera operation buttons 400b that has been operated to the camera 100, instead of transmitting the <User Control Pressed> command. It is to be noted that the Vendor command including the information indicating the process corresponding to one of the camera operation buttons 400b that has been operated may be a <Vendor Remote Button Down> command.

In the first embodiment, when the camera operation buttons 400b of the remote control 400 have been operated, the television 300 transmits a <User Control Released> command to the camera 100. However, in this case, the television 300 may transmit a Vendor command including information indicating a process corresponding to one of the camera operation buttons 400b that has been released from an operation to the camera 100, instead of transmitting the <User Control Released> command. It is to be noted that the Vendor command including the information indicating the process corresponding to one of the camera operation buttons 400b that has been released from an operation may be a <Vendor Remote Button Up> command.

Other Embodiments

The communication apparatus 100 according to the present invention is not limited to the communication apparatus 100 described in the first embodiment. In addition, the external apparatus 300 according to the present invention is not limited to the external apparatus 300 described in the first embodiment. For example, the communication apparatus 100 according to the present invention may be realized by a system configured by a plurality of apparatuses, and the external apparatus 300 according to the present invention may be realized by a system configured by a plurality of apparatuses.

In addition, the processes executed by the communication apparatus and the functions of the communication apparatus described in the first embodiment may be realized by executing a program using a computer (including a CPU). In this case, the program according to the present invention may be executed by the computer to realize various functions described in the first embodiment.

In addition, the processes executed by the external apparatus and the functions of the external apparatus described in the first embodiment may be realized by a program. In this case, the program according to the present invention may be realized by the computer to realize various functions described in the first embodiment.

Needless to say, the programs according to the present invention may realize various processes and functions described in the first embodiment using an OS operating on the computer or the like.

The programs according to the present invention are read from a recording medium that can be read by the computer, and executed by the computer. As the recording medium that can be read by the computer, a hard disk apparatus, an optical disk, a CD-ROM, a CD-R, a memory card, a ROM, or the like may be used. In addition, the programs according to the present invention may be provided from an external apparatus through a communication interface.

The present invention is not limited to the above embodiments and may be modified and altered in various ways without deviating from the spirit and the scope of the present invention. Therefore, the following claims are attached in order to make public the scope of the present invention.

It is possible that when the user remotely operates an electronic device, the electronic device does not execute a process that is not intended by the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2011/079527, filed Dec. 20, 2011, which is hereby incorporated by reference herein in its entirety.

The invention claimed is:

1. An electronic device comprising:
   a reception unit that receives data from an external apparatus; and
   a control unit that executes a predetermined process after first data for causing the electronic device to start the predetermined process is received from the external apparatus;
   a detecting unit that detects whether the external device is a predetermined apparatus that transmits second data for causing the electronic device to stop the predetermined process;
   wherein, if the detecting unit detects that the external apparatus is not the predetermined apparatus, the control unit stops the predetermined process even if the second data has not been received when a first time elapses since the first data is received, and
   wherein, if the detecting unit detects that the external apparatus is the predetermined apparatus, the control unit does not stop the predetermined process until the second data is received after the first data is received.

2. The electronic device according to claim 1,
   wherein the first data and the second data conform to Consumer Electronics Control.

3. The electronic device according to claim 1,
   wherein the external apparatus and the electronic device communicate with each other through an interface conforming to HDMI.

4. The electronic device according to claim 1,
   wherein the external apparatus includes a transmission unit that transmits the first data to the electronic device if a first instruction for causing the electronic device to execute the predetermined process is inputted, and
   wherein, if the external apparatus is the predetermined apparatus and a second instruction for causing the electronic device to stop the predetermined process is inputted, the transmission unit transmits the second data to the electronic device.

5. The electronic device according to claim 1,
   wherein, if the detecting unit detects that the external apparatus is the predetermined apparatus, the control unit does not stop the predetermined process even if the first time elapses since the first data is received.

6. The electronic device according to claim 1,
   wherein, if data transmitted from the external apparatus cannot be received by the reception unit, the control unit does not execute the predetermined process.

7. The electronic device according to claim 1, wherein
   the detecting unit detects, based on device information obtained from the external apparatus, whether the external apparatus is the predetermined apparatus.

8. The electronic device according to claim 7,
   wherein the device information includes at least either Extended Display Identification Data (EDID) or Enhanced EDID (E-EDID).

9. The electronic device according to claim 1, wherein the detecting unit detects whether the external apparatus is the predetermined apparatus using third data for checking whether the external apparatus is the predetermined apparatus.

10. The electronic device according to claim 9,
    wherein the third data conforms to Consumer Electronics Control.

11. The electronic device according to claim 1, wherein the detecting unit detects that the external apparatus is the predetermined apparatus after a second time elapses without receiving the second data since the first data is received,
    wherein, if the second time does not elapse without receiving the second data since the first data is received, the external apparatus is not detected as the predetermined apparatus.

12. The electronic device according to claim 1,
    wherein, if the second data is received from the external apparatus, the control unit stops the predetermined process.

13. The electronic device according to claim 1,
    wherein the predetermined process includes at least one of a playback process, a recording process, a process for fast-forwarding data, a process for rewinding data, and a process for beginning to capture an image.

14. A control method for controlling an electronic device, the control method comprising:
    executing a predetermined process after first data for causing the electronic device to start the predetermined process is received from an external apparatus;
    detecting whether the external device is a predetermined apparatus that transmits second data for causing the electronic device to stop the predetermined process;
    stopping the predetermined process even if the second data has not been received when a first time elapses since the first data is received if the external apparatus is not the predetermined apparatus; and
    not stopping the predetermined process until the second data is received after the first data is received if the external apparatus is the predetermined apparatus.

15. A non-transitory computer-readable recording medium on which a program is recorded, the program causing a computer to perform a method, the method comprising:
    executing a predetermined process after first data for causing the electronic device to start the predetermined process is received from an external apparatus;
    detecting whether the external device is a predetermined apparatus that transmits second data for causing the electronic device to stop the predetermined process;
    stopping the predetermined process even if the second data has not been received when a first time elapses since the first data is received if the external apparatus is not the predetermined apparatus; and
    not stopping the predetermined process until the second data is received after the first data is received if the external apparatus is the predetermined apparatus.

* * * * *